United States Patent [19]
Oprandi et al.

[11] 4,142,208
[45] Feb. 27, 1979

[54] SYSTEM FOR AUTOMATICALLY CORRECTING THE DUTY FACTOR OF THE CARRIER WAVE ARISING FROM READING-OUT A DATA CARRIER

[75] Inventors: Pierre Oprandi; Jean-Claude Lehureau; Claude Puech; Jean-Paul Peltier; François Le Carvennec; Jean-Pierre Lacotte; Claude Bricot, all of Paris, France

[73] Assignee: Thomson-Brandt, Paris, France

[21] Appl. No.: 816,080

[22] Filed: Jul. 15, 1977

[30] Foreign Application Priority Data
Jul. 16, 1976 [FR] France .................. 76 21819

[51] Int. Cl.² .......................... H04N 5/76; G11B 7/00
[52] U.S. Cl. ............................ 358/127; 179/100.3 V; 358/128; 360/33; 360/36
[58] Field of Search ............... 358/127, 128, 129, 130, 358/132, 4, 8; 360/33, 36, 38; 179/100.3 V; 365/120, 124

[56] References Cited
U.S. PATENT DOCUMENTS

| 3,906,152 | 9/1975 | Hoogendijk | 360/33 |
| 3,909,608 | 9/1975 | LeMerer et al. | 179/100.3 V |
| 3,913,076 | 10/1975 | Lehureau et al. | 179/100.3 V |
| 3,988,531 | 10/1976 | Laub | 360/36 |
| 3,988,532 | 10/1976 | Korpel | 360/36 |

FOREIGN PATENT DOCUMENTS
756444 9/1956 United Kingdom.

Primary Examiner—Raymond F. Cardillo, Jr.
Attorney, Agent, or Firm—Cushman, Darby & Cushman

[57] ABSTRACT

The present invention relates to the read-out of a data carrier having a track along which there is transcribed an angularly modulated carrier wave. In accordance with the present invention, there is provided a system for processing the read-out signal, which uses a feedback loop correcting the duty factor of a restored rectangular waveform when its value deviates from the value 0.5.

4 Claims, 5 Drawing Figures

SYSTEM FOR AUTOMATICALLY CORRECTING THE DUTY FACTOR OF THE CARRIER WAVE ARISING FROM READING-OUT A DATA CARRIER

The present invention relates to the demodulation of the carrier wave produced by the read-out of a data carrier. The invention relates more particularly to means used to reproduce television signals which have been optically or magnetically recorded upon a data carrier by a technique involving the angular modulation of a rectangular waveform.

The optical or magnetic transcription of the various components of a television signal makes use of a multiplexing technique in accordance with which the non-uniform arrangement in time, of the alternations of a rectangular carrier wave, serves to translate the desired modulations. In a typical case relating to television, this composite modulation can be analysed in terms of a frequency modulation produced by the luminance signal, to which there is added a pulse-duration modulation reproducing the chrominance signals if required, and the audio signal accompanying the television video signal.

After the optical magnetic or mechanical read-out of a data carrier, a composite signal is obtained which must successively be re-shaped and demodulated. Re-shaping consists in giving the read out signal a rectangular waveform. After reshaping, the signal is applied to a set of circuits comprising a frequency discriminator. The discriminator is used to reconstitute the luminance signal but in practice it is found that this reconstitution process often leaves something to be desired. In other words, for a number of reasons, after reshaping the read-out signal has a defective duty factor. The result is that the quality of image reproduced upon the screen of a television receiver is impaired by cross-modulation phenomena whose level exceeds the levels which one might estimate by basing predictions upon spectral measurements performed at the input to the frequency demodulator. Experience shows that the observed defects are not serious if the duty factor of the signal for demodulation has a value close to 0.50.

In accordance with the present invention, there is provided a system for automatically correcting the duty factor of a rectangular waveform generated by squaring the signal obtained from reading out a data carrier, said system comprising: squaring means producing said rectangular waveform in response to said signal, filter means connected to the output of said squaring means for selectively transmitting the mean amplitude of said rectangular waveform, voltage comparator means having a first input connected to the output of said filter means and a second input fed with a reference voltage, and feed back means connecting the output of said comparator means to a control input of said squaring means; the voltage applied to said control input controlling the switching threshold of said squaring means; said reference voltage being adjusted for causing the duty factor of said rectangular waveform of being substantially equal to 0.5.

For a better understanding of the present invention and to show how the same may be carried into effect, reference will be made to the ensuing description and the related figures among which:

Figure 2:
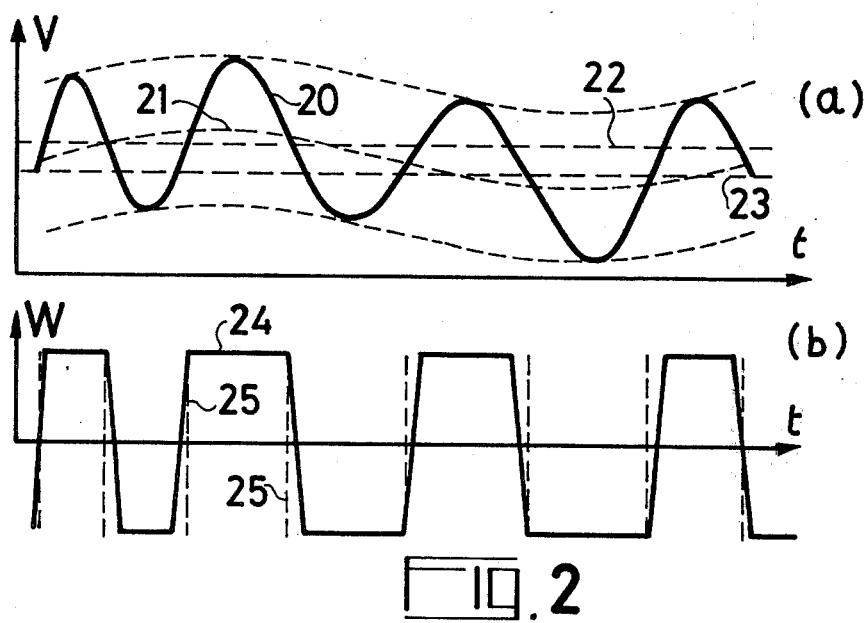
FIG. 2 shows at (a) a multiplexed waveform and at (b) a clipped waveform.
Figure 3:
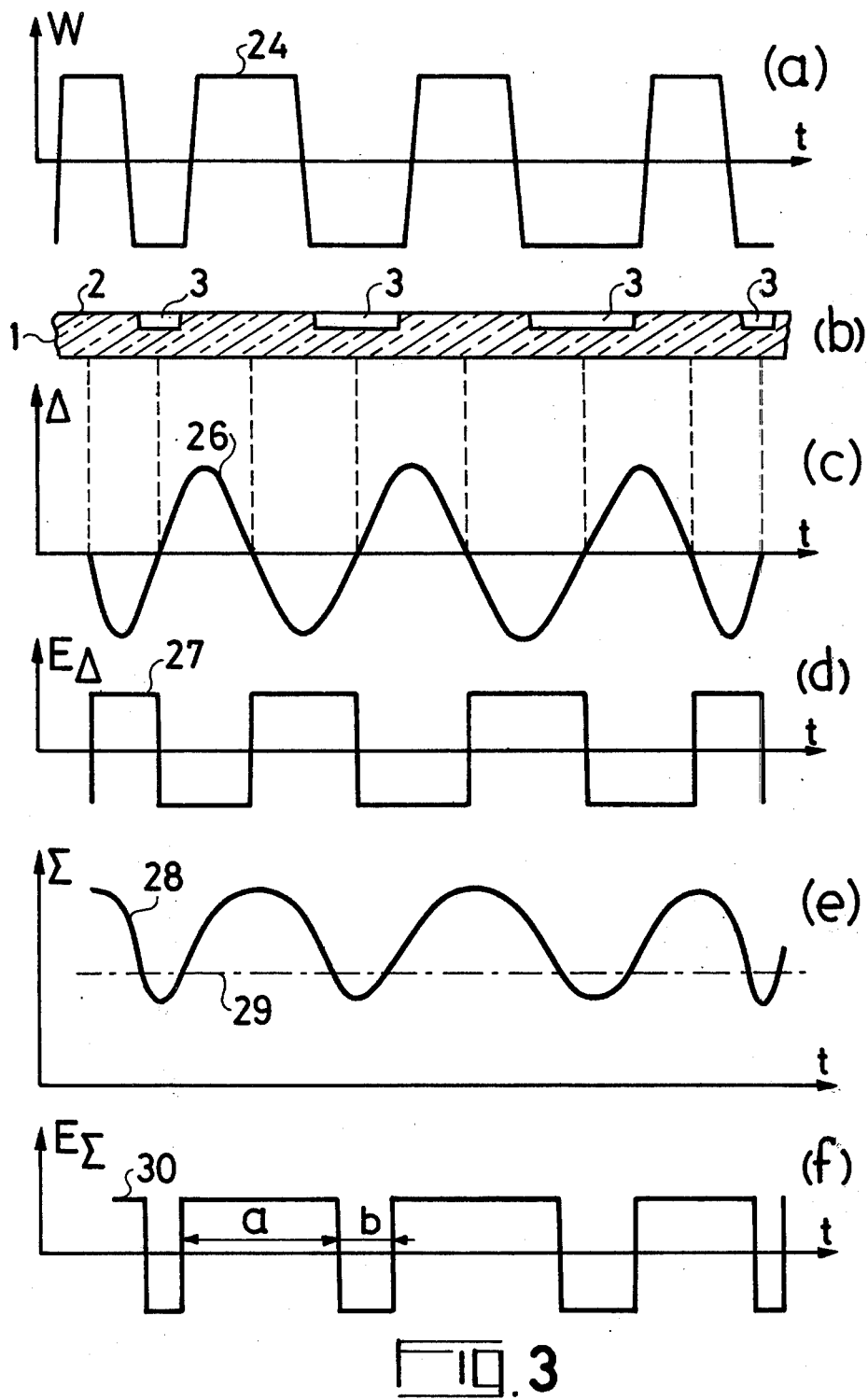
Figure 4:
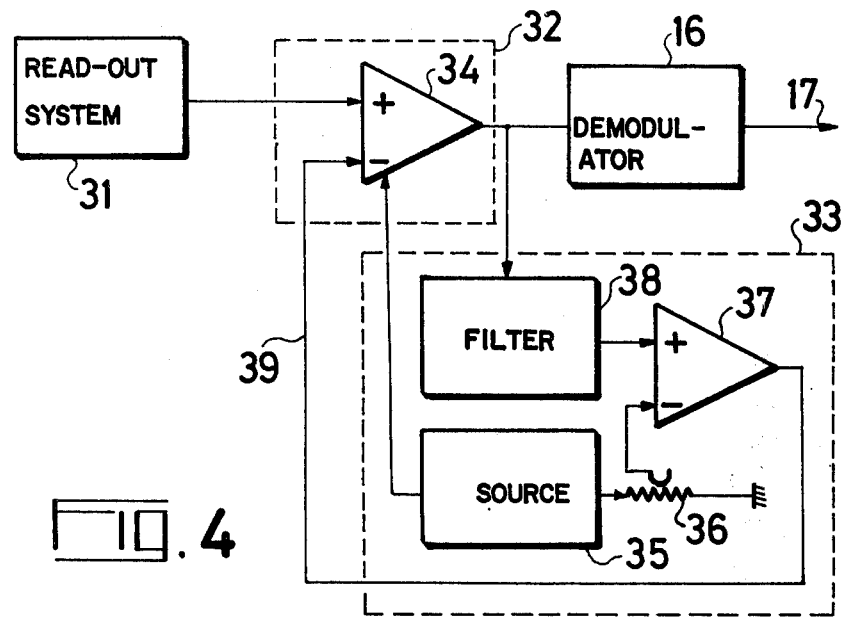
Figure 5:
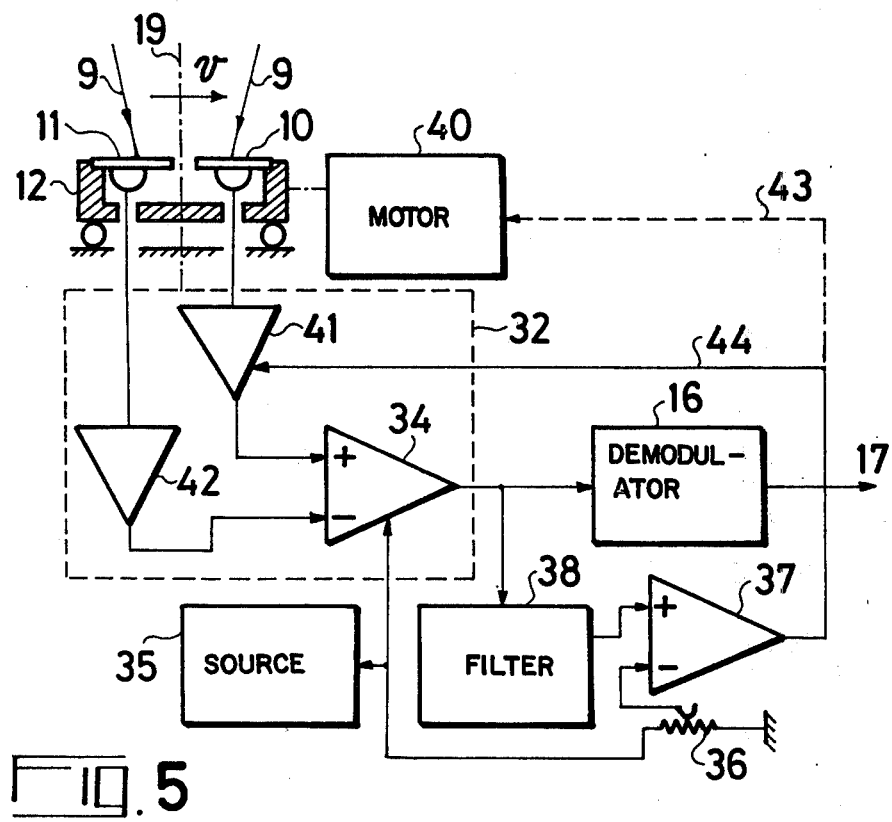

FIG. 3 shows at (a) the clipped waveform of FIG. 2(b), and at (b) a recording of that waveform. FIG. 3 further shows at (c) a push-pull read-out waveform, and at (d) the resulting clipped waveform. FIG. 3 still further shows at (e) a summed read-out waveform, and at (f) the resulting clipped waveform;

FIG. 4 illustrates a first example of a duty factor correcting system;

FIG. 5 illustrates other examples of a duty factor correcting system.

Figure 1:
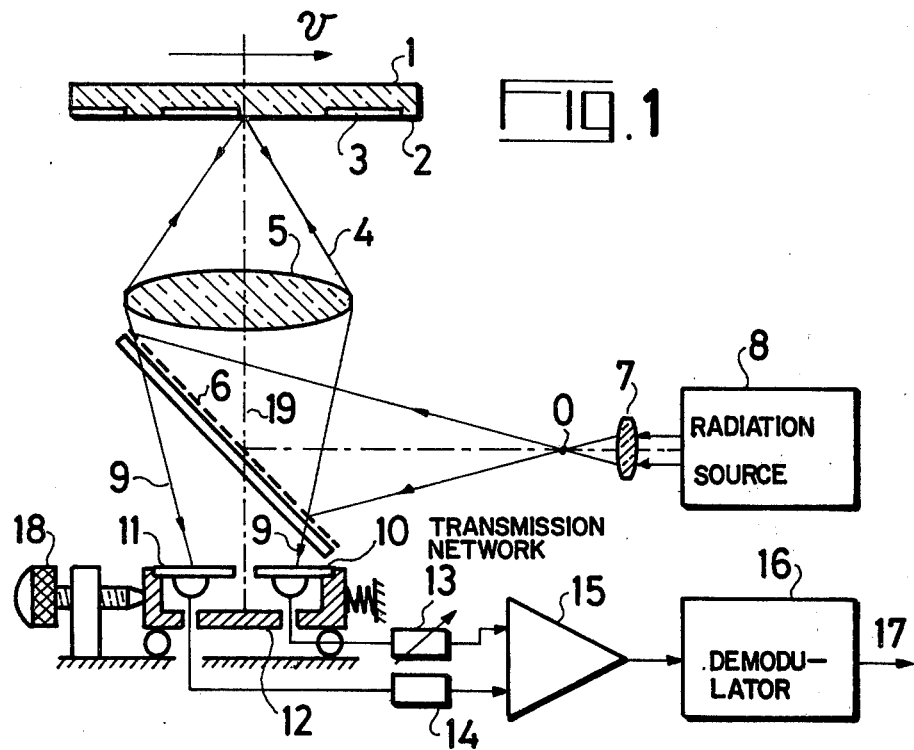
FIG. 1 illustrates a device for the optical read-out of the information carried by a data carrier.

FIG. 1 illustrates the main elements of an optical read-out device which makes it possible to read a recording 1 passing at a speed v, whose face 2 carries an impression in the form of microscopic depressions 3. The microscopic depressions 3 form a string of diffractive elements distributed along a track whose width is sufficiently small to produce by diffraction an angular spread in the read-out radiation. The read-out radiation is contained in a beam 4 whose point of convergence is located in the face 2 at the point where the latter intersects the optical axis 19 of an objective lens 15. The point illumination of the track is performed by a radiation source 8, a lens 7 and a semi-reflective plate 6. The point of convergence 0 of the radiation coming from the lens 7 is conjugated by the objective lens 5 with the aforementioned point of coincidence. The detection of the information recorded in the face 2 of the recording 1 is performed by a pair of photodetector cells 10 and 11 arranged upon a mounting 12. After reflection at the face 2, a fresh transit through the objective lens 5 and transmission by the reflective plate 6, photodetectors 10 and 11 pick up a greater or lesser fraction of the read-out radiation. Electrical circuits 13 and 14 enable the signals furnished by the photodetectors 11 and 10 to be applied to the complementary inputs + and − of a differential amplifier 15. This amplifier, used as a clipper, produces a rectangular waveform the levels of which are determined by the supply voltages to the amplifier 15. The rectangular waveform furnished by the amplifier 15 contains the information in its leading and trailing edges in a form reminiscent of the string of microscopic depressions whose non-uniform width and spacing were used to store it. A demodulator 16 is supplied with the rectangular waveform coming from the amplifier 15 and at the output 17 reconstitutes the desired modulation signal, for example the luminance signal of a television program recorded upon the data carrier 1. The read-out method illustrated in FIG. 1 is the differential method also known as the "push-pull method." An adjuster screw 18 and circuit 13 with a variable transmission factor make it possible to centre the pair of photodetectors 10, 11 in relation to the axis 19 an to equalise the levels of the optically detected signals. When these adjustments have been suitably carried out, it is observed that the demodulation of the rectangular waveform takes place with a low cross-modulation ratio. Another method of detection, the summing mode, is to arrange the signals coming from the photodetectors 10 and 11, in parallel and to apply them to one of the complementary inputs of the amplifier 15, the other input being supplied with a reference voltage. If no other precaution is taken, the summing mode will give rise to more marked cross-modulation effects which are closely dependent upon the characteristics of the impression carried by the recording 1.

In order to provide a more detailed understanding of the disturbance created by the cross-modulation effects, consideration must be given to the fact that the string of microscopic depressions 3 carried by the recording 1 is in fact a more or less faithful transcription of the rectangular carrier wave used as the vehicle of the information. In FIG. 2, the multiplexing technique used to record televisions signals has been illustrated.

FIG. 2 shows multiplexing of a luminance signal Y and an auxiliary signal A which may be a sub-carrier modulated by an accompanying audio signal S or by chrominance components alternatively R-Y and B-Y. The diagram (a) in FIG. 2 illustrates the multiplexing technique. A main carrier wave 20 is frequency-modulated by the luminance signal Y. The waveform 20 contains a superimposed auxiliary signal A represented by the waveform 21 shown in dotted line. By using a clipper circuit whose triggering thresholds are illustrated by the level lines 22 and 23, the waveform 20 can be converted to a rectangular waveform 24 in accordance with the diagram (b) of FIG. 2 which plots the amplitude W of this waveform as a function of time t. The dotted lines 25 mark the position of the edges of the rectangular waveform 24 in the absence of any modulation by the auxiliary signal A.

FIG. 3 shows the recording and read-out mechanisms used for processing the rectangular waveform produced in accordance with the modulation technique which has just been described. At (a) the rectangular waveform 24 has been reproduced showing its spatial development along the axis vt, on which is plotted the running abscissa extending along the track carried by the recording shown at (b). EAch negative alternation in the rectangular waveform 24 is materialised at the face 2 of the recording 1 by a microscopic depression 3. The positive alternations in the rectangular waveform 24 are materialised by intervening areas flush with the face 2. While reading-out the information carried by the recording 1, signals are obtained whose configuration is influenced by the read-out method used. When using the push-pull detection method, the read-out signal before clipping has the kind of waveform 26 shown at (c). If the positioned and sensitivity settings of the photodetectors are appropriate, the zero transits in the waveform 26 will take place when the read-out axis 19 passes precisely through the centre of the microscopic depressions 3 and through the centre of the intervening areas. Vertical lines are used to indicate this agreement between the section (b) and the diagram (c) of FIG. 3. After clipping, the waveform 26 gives rise to a restored rectangular waveform 27 shown at (d) in FIG. 3. The result is that if clipping takes place at zero transit, the transits in the waveform 27 remain centred in relation to the microscopic depression 3 and to the intervening areas, forming the recording 1.

When using the summing read-out method, the read-out signal has the appearance illustrated by the graph 28 shown at (e) in FIG. 3. If the read-out signal 28 is clipped using a triggering threshold as indicated by the chain-dotted line 29 shown at (e) in FIG. 3, then rectangular waveform 30 is reconstituted of the kind shown in (f). The value of the duty factor a/b of the waveform 30 may differ substantially from that of the waveform 24 which originated the recording read-out process. By contrast, the duty factor of the waveform 27 is much closer to that of the waveform 24 and this indicates the superiority of the push-all reading method. It is also worth adding perhaps that the disparity which may occur between the profile of the impression as shown at (b) and the waveform 24, has virtually no repercussion upon the duty factor of the waveform 27.

Experience shows that the images reproduced upon the screen of a television set from a push-pull read-out operation are less subject to cross-modulation defects even if the read out recordings have relatively disparate characteristics. This superiority of the push-pull detection system may be attributed to the fact that the duty factor of the rectangular waveform applied to the demodulation circuit on average has a value of around 0.5. Nevertheless, this condition may not be satisfied for numerous reasons, amongst which one can point to the lack of balance in a read-out system of push-pull kind, the fact that optical read-out of recording may take place using a summing system, or again the choice of a non-optical read-out method. Thus, a magnetic read-out system may well furnish a read-out signal whose duty factor is on average quite different from the optimum value of 0.5. A practical problem then arises of modifying the duty factor of a read-out signal whatever its origin, so that at the input of a demodulation circuit it has a duty factor which is maintained at a mean value of 0.5.

In FIG. 4, there can be seen a diagram of a system for automatically controlling the duty factor of a read-out signal constituted by a waveform whose alternations have oblique flanks, this always being the case since the passband of optical, electrical or magnetic read-out systems is finite. In the case shown in FIG. 4, the read-out system is depicted by the box 31 and the demodulation circuit by the box 16 whose output 17 is connected for example to a television receiver.

Within the box 32, squaring means are provided, for example in the form of differential amplifiers 34 supplied from an electric source 35. Within the box 33 which contains the means used to automatically correct the duty factor, there can be seen a voltage comparator circuit 37 having an input is supplied with the mean value of the rectangular waveform delivered by the squaring unit 32. A mean value is extracted by means of a circuit 38 which, by way of a non-limitative example, is an integrating circuit. The potentiometer 36 supplied by the source 35 furnishes a variable reference voltage which is applied to the second input of the comparator circuit 37. The voltage furnished by the comparator 37 is fed back by a negative feedback loop 39 to the control input of squaring means 32. The wiper of the potentiometer 36 is adjusted in such a fashion that the duty factor of the rectangular waveform furnished by the amplifier 34 has a mean value substantially equal to 0.5. If V is the supply voltage of the amplifier 34 and if the rectangular waveform oscillates between the values O and V, the cursor of the potentiometer 36 should be adjusted to produce the voltage V/2, i.e. should be adjusted to a position half way along its travel if supplied with the voltage V and if having a liner taper.

If the duty factor deviates from the value 0.5, the mean value furnished by the integrating circuit 38 changes. The comparator 37 undergoes a modification in output voltage in a direction such that the switching threshold of the squaring circuit 32 changes value. Since the read-out signal has alternations whose flanks are inclined, the displacement of the switching threshold produces a corresponding correction in the duty factor of the squared waveform. As far as the circuit 38 selecting the mean value of the rectangular waveform is concerned, it will be seen that it is necessary to transmit the d.c. component of this wave whilst eliminating the a.c. components. To this end, if an integrator is being used, the time constant is chosen sufficiently long in relation to the longest period in the supplied rectangular waveform. Since automatic correcton tends to influence the angular modulation of the rectangular waveform it may be advantageous to adjust the time constant of the integrator 38 in order not to affect the input of the comparator 37 by duty factor fluctuations which are due to angular modulation. This leads to the choice of a time constant at least equal to the longest period of the sub-carrier wave 21 shown at (a) in FIG. 2.

Whatever the case, the fact of choosing a time constant which produces an attenuation in the sub-carrier is no barrier to the proper demodulation of the main carrier wave 20 shown at (a) in FIG. 2. It is still possible to properly demodulate the sub-carrier since the read-out signal is intact at the input of the clipper circuit 31. The automatic correcting system which has been described here is suitable for use with any read-out method provided that the read-out signal obtained has alterations with inclined flanks which lend themselves to variation in the duty factor within a range which includes the design value of 0.5.

In FIG. 5, there can be seen two variant embodiments which are more especially intended for optical read-out using the push-pull method. The references employed are for the most part those employed in FIGS. 1 and 4. In accordance with one of these variant embodiments, photodetectors 10 and 11 are followed by amplifiers 41 and 42 applying the detected signals to the inputs + and − of the amplifier 34. The amplifier 41 constitutes a transmission channel of the variable-gain kind and is supplied at a gain control input with the correcting signal coming from the negative feedback loop 44. In contrast to the condition encountered in FIG. 4 the correcting signal delivered by the amplifier 37 does not modify the level of the switching threshold. The correcting signal to a greater or lesser extent influences the level of one of the two detected signals and this comes down to the same thing as ensuring balanced operation of the push-pull detection method.

The other variant embodiment shown in FIG. 5 assumes that the mounting 12 for the photodetector 10 and 11 can displace in the direction of the track being read relatively to the axis 19 of the read-out beam 9. The motor 40 enables the displacement to take place under the control of the negative feedback loop 43. Thus, automatic correction of the duty factor is performed by recentering the photodetectors. It should be pointed out that the variant embodiments illustrated in FIG. 5 are advantageous ones since they are associated with the push-pull read-out method which, by its very nature furnished a duty factor in the neighbourhood of 0.5.

What we claim is:

1. A system for demodulating a signal obtained from reading out a data carrier, said system comprising: frequency demodulator means; waveform conversion means for producing a rectangular waveform in response to said signal, and applying said rectangular waveform to the input of said demodulator means; and means for automatically correcting the duty factor of said rectangular waveform said correcting means comprising filter means connected to the output of said waveform conversion means for selectively transmitting the mean amplitude of said rectangular waveform, voltage comparator means having a first input connected to the output of said filter means and a second input fed with a reference voltage, and feedback means connecting the output at said comparator means to a control input of said waveform conversion means; the voltage applied to said control input controlling the switching threshold of said waveform conversion means; said reference voltage being adjusted for causing the duty factor of said rectangular waveform of being substantially equal to 0.5.

2. A system as claimed in claim 1, wherein filter means comprise an integrator circuit having a time constant at least equal to the longest period occurring in said rectangular waveform.

3. A system as claimed in claim 2, wherein said time constant is at least equal to the period of the lowest alternating component contained in the spectrum of said rectangular waveform.

4. A system as claimed in claim 1, wherein said waveform conversion means comprise a differential amplifier; one of the inputs of said differential amplifier being supplied with said signal; the other input of said differential amplifier being said control input.

* * * * *